Patented Aug. 4, 1953

2,647,882

UNITED STATES PATENT OFFICE 2,647,882

ETHERIFICATION OF VINYL PHENOL POLYMERS AND COPOLYMERS

Edward Michael Evans and John Edward Seager Whitney, Tonbridge, England, assignors to British Resin Products Limited, London, England, a British company No Drawing. Application November 16, 1949, Serial No. 127,784. In Great Britain November 24, 1948

8 Claims. (Cl. 260—47)

The present invention relates to the etherification of polymeric resins having vinyl phenol-type units in their molecular structure and has as one object the production of new thermoplastic and thermosetting resins of wide application in the moulding powder, lacquer and adhesive fields.

By "vinyl phenol-type" is meant ortho, meta and para vinyl phenols and their lower molecular homologues, and the resins which may be treated by the process of this invention are the polymers and copolymers of these monomers, which can be produced for example by the processes described in our copending applications Serial No. 127,781, filed November 16, 1949, and Serial No. 127,782, filed November 16, 1949.

When etherification is desired of the simple polymer or a copolymer containing sufficient vinyl phenol-type units, particularly if the comonomer is of a polar nature, the resin is generally most conveniently dissolved or dispersed in an alkaline polar medium, such as water, a lower aliphatic alcohol or a mixture of these. Otherwise, a solution in an inert non-polar organic solvent, including solvent mixtures, predominantly non-polar, or a fine dispersion of the polymer or copolymer in a fluid medium such as is produced by emulsion polymerization, may be used. Thus, a styrene copolymer containing more than about 20 mol. percent of vinyl phenol units, or a vinyl acetate copolymer containing more than 5 mol. percent of vinyl phenol units, may be dissolved or dispersed in an alkaline polar medium, as described above, while a styrene copolymer containing less than about 20 mol. percent of vinyl phenol units is conveniently treated in solution in benzene or benzene alcohol mixtures. When using a non-polar medium, in which an alkali or alkaline earth metal hydroxide is substantially insoluble, it is preferred to use a quaternary ammonium hydroxide as condensing agent, since bases such as pyridine, while active in this respect, tend also to undergo reaction with the etherifying agent themselves with consequent inactivation. The quantity of alkali used as condensing agent is preferably an at least equimolecular amount, based on the phenolic groups to be etherified.

The etherifying agent may be a material such as an alkyl, alkenyl or aralkyl inorganic ester such as a sulphate, chloride, bromide, iodide, but not a fluoride or nucleus thereof, for example dimethyl or diethyl sulphate, and allyl or beta methallyl chloride. In many cases, where an unsaturated product results, the resulting resin will be found to have thermosetting properties, and may be vulcanised by known methods.

According to a modification of this invention, the polymeric material is treated with both an aldehyde and an etherifying agent, either simultaneously or separately, to produce an improved thermosetting resin which may be compounded with fillers, plasticisers, lubricants, etc., for the formation of moulding powders and the like or may be dissolved or dispersed in a suitable medium to form a lacquer base or an adhesive. When employing an aldehyde in this way it is essential that the vinyl phenol units should have at least one, and preferably two, unsubstituted hydrogen atoms in the reactive ortho and para positions. It is also preferred that the polymer or copolymer should be free from, or deficient in ortho vinyl phenol type units since the material then exhibits a much higher reactivity towards aldehydes. The modified reaction may be conducted under conditions similar to those described for the simple etherification.

The effect of treating vinyl phenol type units with the etherifying agent and aldehyde is to convert some to etherified units having little further activity, at the same time modifying the properties of the final resin, and to effect condensation between at least some of the remaining units and the aldehyde to produce reactive centres capable of cross-linking the polymer chains on subsequent curing. When more than an equivalent amount of either of the two reactants is employed, they will compete for the vinyl phenol-type units, but, in general, a sufficient proportion will react with the aldehyde to ensure heat convertibility of the product. In this respect, it is preferable that any copolymer used should contain at least 2 mol. percent of the vinyl phenol-type units available for reaction with the aldehyde.

If desired, the modified reaction may be effected in two stages, the vinyl phenol-type units being reacted with less than an equivalent of one reagent in a first stage and then subsequently with the other. The most convenient order will depend on the solubility characteristics of the resin, the effect of etherification being usually to promote solubility in non-polar solvents and to depress solubility in polar solvents. Thus, if it is desired to avoid separation of the intermediate product at the end of, or during the first step, the etherification is best effected first when using a non-polar solvent solution, and the aldehyde condensation first when using a polar solvent solution. If a fine aqueous dispersion of the solid resin is used, the order of treatment is of less consequence.

The etherifying agent used in the modified reaction may also be a material such as dimethyl sulphate donating a saturated ether unit or a material such as allyl chloride donating an unsaturated ether unit, the latter conferring more rapid thermosetting properties.

The following examples illustrate the preparation of novel resins according to the process of the invention, the parts being by weight.

*Example 1*

50 parts of colourless substantially pure meta-vinyl phenol polymer, formed by allowing meta vinyl phenol to polymerise to the soft rubbery state for 1 week at 18° C. in a closed vessel in the absence of any catalyst were masticated with two successive 50 part portions of benzene, broken into coarse lumps, shredded in a Werner-Pfleiderer type shredder through which benzene was allowed to flow continuously, and dried to give 20 parts of a high molecular weight poly meta vinyl phenol in the form of a white free-flowing coarse powder.

This was then dissolved in 40 parts of 30% aqueous sodium hydroxide solution, and 19 parts of allyl chloride were incorporated. The vessel containing the mixture was then sealed, and the whole allowed to stand at 18° C. for 24 hours, by which time the mass had formed an opaque rubbery gel. The product was comminuted, washed free from salts by dilute sulphuric acid and then with water until neutral, and dried. It was a thermosetting resin suitable for moulding.

*Example 2*

A mixture of 75 parts of meta-vinyl phenol and 25 parts of styrene was maintained at 10° C. for 16 hours in an atmosphere of nitrogen to give a soft, rubbery copolymer soluble in ethanol and substantially insoluble in benzene. 10 parts of the product were dissolved in 20 parts of hot 30% aqueous sodium hydroxide solution, cooled to 20° C. and treated, drop by drop, while stirring and cooling to keep the temperature below 50° C. with 11 parts of dimethyl sulphate.

Stirring was continued until the methyl ether separated as a rubbery mass, which was washed with water and purified by dissolving in 10 parts of benzene and then precipitating by pouring into a relatively large volume of ethanol.

Repetition of this purification process for several cycles gave a non-tacky resin which could readily be disintegrated to a fibrous powder, suitable for the formulation of thermoplastic moulding powders and coating compositions. By comparison with the original copolymer, the etherified material was resistant not only to water but also to aqueous sodium hydroxide, and was soluble in benzene whereas the original copolymer was insoluble.

*Example 3*

A mixture of 10 parts of meta vinyl phenol and 90 parts of styrene was maintained at 100° C. for 16 hours in an atmosphere of nitrogen to give a hard, brittle copolymer soluble in benzene but substantially insoluble in ethanol and in boiling 5% aqueous sodium hydroxide solution. 10 parts of the product were dissolved in 50 parts of benzene containing 1 part of methyl pyridinium hydroxide and 2 parts of dimethyl sulphate were introduced while stirring, the mixture being held at a temperature of 50° C. for 2 hours. On completion of the reaction, the etherified copolymer was precipitated by pouring the mixture into a relatively large excess of ethanol.

*Example 4*

10 parts of a polymeric meta vinyl phenol, prepared by spontaneous polymerisation of pure meta vinyl phenol at 18° C. for one week followed by extraction of the lower molecular weight material with benzene were dissolved in 40 parts of a 10% sodium hydroxide solution and 6½ parts of 37.5% formaldehyde solution were introduced with stirring. The mixture was held at 50° C. for 30 minutes and 5.3 parts of dimethyl sulphate were then introduced with vigorous stirring, the agitation being continued until the etherified product separated. The mass was then neutralised with 2-normal sulphuric acid and the product filtered, washed free from salts with water and dried under vacuum and at a temperature below 40° C. It was found to be thermo-setting and suitable for the production of moulding powders, lacquers and adhesives as described above.

*Example 5*

20 parts of a copolymer produced by the emulsion polymerisation of equal weights of styrene and m-vinyl phenol were dissolved in 150 parts of a mixture of equal volumes of benzene and ethyl alcohol, 40 parts of a 25% aqueous solution of tetramethyl ammonium hydroxide were thoroughly dispersed into the solution with vigorous stirring followed by 30 parts of diethyl sulphate. The mass was then allowed to stand for 1½ hours at a temperature of 40° C. Alcohol was then added until the etherified product had separated, this being removed by filtration, washed with alcohol, redissolved in benzene and reprecipitated by pouring into alcohol, as a soft fibrous precipitate which on separating and drying was found to possess improved flexibility and water resistance.

*Example 6*

25 parts of poly m-vinyl phenol, as used in Example 1, were dissolved in 100 parts of a 10% aqueous sodium hydroxide solution and a mixture of 24 parts of diethyl sulphate (¾ mol.) and 6.25 parts of allyl bromide (¼ mol.) were added and thoroughly dispersed by shaking. The temperature rose to 45° C. and after 30 minutes the mixed ether had separated from solution. 5% sulphuric acid solution was then introduced to neutralise the sodium hydroxide and the product separated by filtration and washed free from salts with water. After further washing with alcohol, the product was air dried.

This material was then treated as follows:

1. A portion was heated under pressure at 130° C. for one hour by which time it had thermoset to a hard mass.

2. To 10 parts of the product dissolved in 50 parts of benzene was added 0.1 part tertiary butyl hydroperoxide and films were prepared and stoved at 130° C. for 15 minutes by which time they had been rendered insoluble in benzene.

*Example 7*

20 parts of a copolymer prepared by the emulsion polymerisation of 75 parts of methyl acrylate and 25 parts of m-vinyl phenol were dissolved in 150 parts of a mixture of equal volumes of industrial methylated spirit and benzene. 40 parts of a 25% aqueous solution of tetramethyl ammonium hydroxide were introduced, followed by 1 gram of beta methallyl chloride. A further addition of 60 parts of industrial methylated spirit was then made in order to render the mixture homogeneous. It was then allowed to stand at room temperature for 18 hours, neutralised by the addition of N sulphuric acid solution to pH 7 and poured into a 1,000 parts of a 5% aqueous sodium chloride solution. The rubbery precipitate which separated was removed by filtration, washed with water and dried at room temperature. Further purification was effected by dissolving the product in 100 parts of an alcohol benzene mixture and precipitating by the addition of a large volume of a mixture containing 25% benzene and 75% petroleum ether, the precipitate being separated, washed with petroleum ether and allowed to dry at room temperature. On heating this etherified copolymer at 130° C. for one hour under pressure it was found to have undergone cross-linking to a form insoluble in alcohol-benzene mixture.

*Example 8*

54 parts of a copolymer prepared by the interpolymerisation of a mixture of 74.5% styrene 24.5% o-vinyl phenol in the presence of 1% tertiary butyl hydroperoxide was dissolved in benzene to give a 10% w/w solution. 19 parts of methyl pyridinium hydroxide was then added followed by 16 parts of diethyl sulphate. The mixture was then held at 40° C. for 2 hours with continuous stirring, filtered and the etherified copolymer precipitated by pouring in industrial methylated spirit, separated by filtration, washed with industrial methylated spirit and dried in an oven at 70° C. for three hours.

Amongst the copolymers which may be etherified, with or without cross-linking, according to this invention are those of vinyl phenol compounds with comonomers such as butadiene hydrocarbons, chloroprene, styrene compounds, vinyl naphthalenes, acenaphthylene, N-vinyl compounds such as vinyl pyridine, cyclopentadiene, vinyl and vinylidene halides, vinyl esters, acrylic esters, unsaturated aldehydes such as acrolein, and allyl compounds. These copolymers may contain any proportion of the vinyl phenol-type units, for example, from 0.1% to 99.9%. Suitable aldehydes include acetaldehyde, butyraldehyde, furfural, benzaldehyde and formaldehyde, the latter being preferred.

We claim:

1. A process as claimed in claim 7, wherein an alkaline condensing agent is present in at least equimolecular proportion relative to the vinyl phenol compound.

2. A process as claimed in claim 7, wherein the polymeric material is dissolved in benzene.

3. A process as claimed in claim 7, wherein the polymeric material is dispersed in a fluid medium.

4. A process as claimed in claim 7, wherein the polymeric material is a copolymer of the vinyl phenol compound with a copolymerisable substance.

5. A process as claimed in claim 7, wherein the polymeric material is also reacted with an aldehyde.

6. A process as claimed in claim 5, wherein the aldehyde is selected from the group consisting of formaldehyde, acetaldehyde, butyraldehyde, benzaldehyde and furfuraldehyde.

7. A process for the production of a resin which comprises, treating a polymeric material having in its molecular structure polymer units selected from the group consisting of ortho, meta and para vinyl phenol polymer units and their lower nuclear homologue polymers having at least one unsubstituted reactive nuclear hydrogen atom in the nucleus, with an etherifying agent selected from the group consisting of alkyl, alkenyl and aralkyl sulphates, chlorides, bromides and iodides.

8. Resins produced by the reaction of a polymeric material having in its molecular structure polymer units selected from the group consisting of ortho, meta and para vinyl phenols and their lower nuclear homologues having at least one unsubstituted reactive nuclear hydrogen atom in the nucleus with an etherifying agent and an aldehyde, said etherifying agent being selected from the group consisting of alkyl, alkenyl and aralkyl sulphates, chlorides, bromides and iodides.

EDWARD MICHAEL EVANS.
JOHN EDWARD SEAGER WHITNEY.

References Cited in the file of this patent

UNITED STATES PATENTS

| Number | Name | Date |
|---|---|---|
| 2,470,752 | Bobalek | May 24, 1949 |
| 2,485,294 | Kropa | Oct. 18, 1949 |
| 2,499,365 | De Groote | Mar. 7, 1950 |
| 2,522,501 | Brooks | Sept. 19, 1950 |